(12) United States Patent
De Filippis (10) Patent No.: US 9,997,971 B2
(45) Date of Patent: Jun. 12, 2018

(54) ELECTRICAL MACHINE

(71) Applicant: SPAL AUTOMOTIVE S.r.l., Correggio (Reggio Emilia) (IT)

(72) Inventor: Pietro De Filippis, Varazze (IT)

(73) Assignee: SPAL AUTOMOTIVE S.r.l., Correggio (Reggio) (IT)

( * ) Notice: Subject to any disclaimer, the term of this patent is extended or adjusted under 35 U.S.C. 154(b) by 156 days.

(21) Appl. No.: 14/651,556

(22) PCT Filed: Dec. 16, 2013

(86) PCT No.: PCT/IB2013/060976
§ 371 (c)(1),
(2) Date: Jun. 11, 2015

(87) PCT Pub. No.: WO2014/097109
PCT Pub. Date: Jun. 26, 2014

(65) Prior Publication Data
US 2015/0333589 A1 Nov. 19, 2015

(30) Foreign Application Priority Data

Dec. 18, 2012 (IT) .............................. BO2012A0682
Jul. 31, 2013 (IT) .............................. BO2013A0424

(51) Int. Cl.
*H02K 3/50* (2006.01)
*H02K 11/00* (2016.01)
(Continued)

(52) U.S. Cl.
CPC ................. *H02K 3/50* (2013.01); *H02K 1/22* (2013.01); *H02K 3/522* (2013.01); *H02K 5/10* (2013.01);
(Continued)

(58) Field of Classification Search
CPC ............. H02K 5/00; H02K 5/225; H02K 3/50
(Continued)

(56) References Cited

U.S. PATENT DOCUMENTS 2,330,938 A   10/1943  Williams
3,250,930 A *  5/1966  Hackney ............. H01B 17/306
                                              174/151

(Continued)

FOREIGN PATENT DOCUMENTS

CN      1210207 A    3/1999
CN    101101008 A    1/2008
(Continued)

OTHER PUBLICATIONS

Chinese Office Action dated Jan. 26, 2016 for related Chinese patent application No. 201280028731.0.
(Continued)

*Primary Examiner* — Robert W Horn
(74) *Attorney, Agent, or Firm* — Shuttleworth & Ingersoll, PLC; Timothy Klima (57) ABSTRACT

An electric motor including a casing; a cap coupled to the casing to form a housing of the electric motor; a stator, including a plurality of poles and a three-phase winding, each phase having one end, housed in the housing; a rotor inserted in the housing and rotatably constrained to it; a control printed circuit board connected to the stator; the outside of the housing including a seat for the printed circuit board in communication with the inside of the housing by means of at least one hole; the printed circuit board is housed in the seat and the electric motor includes a rigid system for sealed connection between the printed circuit board and the winding at the hole.

20 Claims, 7 Drawing Sheets

(51) Int. Cl.
  *H02K 5/20* (2006.01)
  *H02K 1/22* (2006.01)
  *H02K 5/10* (2006.01)
  *H02K 3/52* (2006.01)
  *H02K 5/22* (2006.01)
  *H02K 11/33* (2016.01)
  *H02K 5/173* (2006.01)

(52) U.S. Cl.
  CPC ............... *H02K 5/20* (2013.01); *H02K 5/225* (2013.01); *H02K 11/00* (2013.01); *H02K 11/33* (2016.01); *H02K 5/1732* (2013.01)

(58) Field of Classification Search
  USPC .................................................... 310/71, 225
  See application file for complete search history.

(56) References Cited

U.S. PATENT DOCUMENTS

| | | | | |
|---|---|---|---|---|
| 4,800,307 A * | 1/1989 | Papst | ............... | H02K 29/08 310/67 R |
| 4,853,568 A * | 8/1989 | Fujiwara | ............... | H02K 5/225 174/51 |
| 4,985,654 A * | 1/1991 | Morikane | ............... | H01R 39/36 174/23 R |
| 4,988,905 A * | 1/1991 | Tolmie, Jr. | ............... | H02K 29/06 310/68 B |
| 5,309,054 A * | 5/1994 | Yamamoto | ............... | H02K 5/225 174/73.1 |
| 5,606,208 A * | 2/1997 | Sakashita | ............... | H02P 9/102 310/194 |
| 5,610,458 A * | 3/1997 | Baker | ............... | F04D 25/08 310/68 R |
| 5,770,902 A * | 6/1998 | Batten | ............... | H02K 5/225 310/68 D |
| 5,825,107 A * | 10/1998 | Johnson | ............... | H02K 11/33 310/64 |
| 5,847,477 A * | 12/1998 | Shiroyama | ............... | H02K 11/40 310/249 |
| 5,939,807 A * | 8/1999 | Patyk | ............... | H02K 5/161 310/64 |
| 6,020,660 A * | 2/2000 | Wright | ............... | H02K 29/08 310/214 |
| 6,030,186 A | 2/2000 | Tang | | |
| 6,081,056 A * | 6/2000 | Takagi | ............... | H02K 5/08 310/216.137 |
| 6,133,666 A * | 10/2000 | Hollenbeck | ............... | H02K 1/145 310/194 |
| 6,177,740 B1 * | 1/2001 | Burns | ............... | H02K 5/225 310/64 |
| 6,268,669 B1 * | 7/2001 | Wakao | ............... | B62D 5/0406 180/443 |
| 6,291,914 B1 * | 9/2001 | Mukaiyama | ......... | G01D 11/245 310/68 B |
| 6,333,576 B1 * | 12/2001 | Ishikawa | ............... | H02K 1/187 310/67 R |
| 6,417,588 B2 * | 7/2002 | Niimi | ............... | H01R 39/383 310/249 |
| 6,483,213 B1 * | 11/2002 | Hsu | ............... | H02K 3/522 310/68 R |
| 6,528,919 B2 * | 3/2003 | Fujii | ............... | H02K 5/10 310/52 |
| 6,538,350 B2 * | 3/2003 | Martin | ............... | H02K 5/225 310/43 |
| 6,577,030 B2 * | 6/2003 | Tominaga | ............... | B62D 5/0406 310/64 |
| 6,617,719 B2 * | 9/2003 | Sunaga | ............... | H02K 3/50 310/64 |
| 6,661,134 B2 * | 12/2003 | Sunaga | ............... | H02K 11/33 310/64 |
| 6,896,494 B2 * | 5/2005 | Sunaga | ............... | F04D 13/064 310/64 |
| 6,927,522 B2 * | 8/2005 | Skofljanec | ............... | H02K 11/33 310/239 |
| 7,211,914 B2 * | 5/2007 | Hofmann | ............... | H02K 5/10 310/68 R |
| 7,586,227 B2 | 9/2009 | Spaggiari | | |
| 7,608,954 B2 * | 10/2009 | Kojima | ............... | H02K 1/14 310/45 |
| 7,622,834 B2 * | 11/2009 | Fujii | ............... | H02K 5/225 310/68 R |
| 7,679,230 B2 * | 3/2010 | Yamada | ............... | H02K 3/522 310/180 |
| 7,777,376 B2 * | 8/2010 | Horng | ............... | H05K 1/189 310/68 R |
| 7,812,488 B2 * | 10/2010 | Cosco | ............... | H02K 29/08 257/659 |
| 7,990,001 B2 * | 8/2011 | Hatano | ............... | H02K 5/225 310/71 |
| 8,076,810 B2 | 12/2011 | Spaggiari | | |
| 8,083,477 B2 | 12/2011 | Hwang et al. | | |
| 8,120,216 B2 * | 2/2012 | Sakata | ............... | H02K 3/522 310/216.115 |
| 8,324,769 B2 * | 12/2012 | Clendenen | ............... | H02K 11/33 310/68 D |
| 8,421,298 B2 * | 4/2013 | Horng | ............... | F04B 35/04 310/215 |
| 8,803,387 B2 * | 8/2014 | Kreidler | ............... | H02K 11/33 310/68 R |
| 8,896,169 B2 * | 11/2014 | Song | ............... | H02K 5/20 29/596 |
| 8,907,537 B2 * | 12/2014 | Sekertzis | ............... | H02K 5/04 310/89 |
| 9,148,044 B2 * | 9/2015 | De Filippis | ............... | F04D 25/08 |
| 9,431,881 B2 * | 8/2016 | Clendenen | ............... | H02K 11/33 |
| 9,590,323 B2 * | 3/2017 | Winheim | ............... | H01R 4/2425 |
| 9,881,019 B2 * | 1/2018 | Matsuo | ............... | G06F 17/30174 |
| 2002/0047504 A1 * | 4/2002 | Takahashi | ............... | H01R 12/58 310/71 |
| 2004/0027014 A1 * | 2/2004 | Weigold | ............... | H02K 5/225 310/68 R |
| 2004/0208760 A1 | 10/2004 | Yap et al. | | |
| 2007/0001527 A1 * | 1/2007 | Takahashi | ............... | H02K 11/33 310/71 |
| 2007/0001528 A1 * | 1/2007 | Umegaki | ............... | H02K 3/522 310/88 |
| 2007/0001529 A1 * | 1/2007 | Takahashi | ............... | H02K 5/10 310/88 |
| 2007/0069841 A1 * | 3/2007 | Kusano | ............... | H02K 3/522 335/202 |
| 2007/0178723 A1 * | 8/2007 | Kataoka | ............... | H02K 3/50 439/76.2 |
| 2007/0241625 A1 * | 10/2007 | Terauchi | ............... | G01D 11/30 310/68 B |
| 2008/0224553 A1 | 9/2008 | Abe et al. | | |
| 2010/0264762 A1 * | 10/2010 | Dautel | ............... | F01P 5/02 310/64 |
| 2012/0153750 A1 * | 6/2012 | Kim | ............... | H02K 3/522 310/71 |
| 2012/0200957 A1 * | 8/2012 | Yawata | ............... | G11B 19/2009 360/99.08 |
| 2012/0223604 A1 | 9/2012 | Hennecke et al. | | |
| 2013/0039783 A1 | 2/2013 | Wagner et al. | | |
| 2013/0049495 A1 | 2/2013 | Matsuo | | |
| 2013/0062137 A1 * | 3/2013 | Motoda | ............... | B62D 5/0406 180/446 |
| 2013/0113314 A1 * | 5/2013 | Lim | ............... | H02K 5/225 310/71 |
| 2013/0257193 A1 * | 10/2013 | Toda | ............... | H02K 5/10 310/52 |
| 2013/0278090 A1 | 10/2013 | Matsuo | | |
| 2015/0076942 A1 * | 3/2015 | Madsen Obel | ......... | H02K 5/18 310/59 |
| 2015/0229172 A1 * | 8/2015 | Kashihara | ............... | H02K 11/048 310/71 |

(56) References Cited

U.S. PATENT DOCUMENTS

| | | | | |
|---|---|---|---|---|
| 2015/0333589 | A1* | 11/2015 | De Filippis | H02K 5/10 310/71 |
| 2016/0094106 | A1* | 3/2016 | Yamasaki | H01R 12/57 310/71 |
| 2016/0156246 | A1* | 6/2016 | Hotori | H02K 5/225 310/43 |

FOREIGN PATENT DOCUMENTS

| | | |
|---|---|---|
| CN | 101443984 A | 5/2009 |
| CN | 100525015 C | 8/2009 |
| CN | 101649845 A | 2/2010 |
| CN | 202056103 U | 11/2011 |
| CN | 102638149 A | 8/2012 |
| DE | 29906775 | 7/1999 |
| DE | 102008000124 | 7/2009 |
| EP | 0482378 | 4/1992 |
| EP | 1622241 | 2/2006 |
| EP | 2072754 | 6/2009 |
| EP | 2215705 | 8/2010 |
| EP | 2495850 | 9/2012 |
| EP | 2498383 | 9/2012 |
| JP | S55-74252 | 5/1980 |
| JP | H01-159561 | 11/1989 |
| JP | H06-10483 | 9/1994 |
| JP | H07-59327 | 3/1995 |
| JP | 8082427 | 3/1996 |
| JP | 2004-187437 A | 7/2004 |
| JP | 2008306917 A | 12/2008 |
| JP | 2008309057 A | 12/2008 |
| JP | 2011182480 A | 9/2011 |
| JP | 2011-234602 A | 11/2011 |
| JP | 2012-124999 A | 6/2012 |
| JP | 2012195986 A | 10/2012 |
| RU | 2010121649 A | 12/2011 |
| RU | 2497263 | 10/2013 |
| SU | 989681 A1 | 1/1983 |
| WO | 2009/069103 | 6/2009 |
| WO | 2011/104909 | 9/2011 |
| WO | WO2011113521 A1 | 9/2011 |
| WO | 2012/041584 | 4/2012 |
| WO | 2012/096335 | 7/2012 |
| WO | 2013/179256 | 12/2013 |

OTHER PUBLICATIONS

Chinese Office Action dated Nov. 4, 2016 from counterpart Chinese application.

International Search Report dated Feb. 21, 2014 from counterpart App No. PCT/IB2013/060976.

International Search Report and Written Opinion dated Dec. 20, 2013 from counterpart app No. PCT/IB2013/054473.

Japanese Office Action dated Aug. 29, 2017 from counterpart JP App No. 2015-547253.

Russian Office Action dated Sep. 6, 2017 and Search Report dated Sep. 1, 2017 from counterpart Russian App No. 2015129015/07(044912).

* cited by examiner

ELECTRICAL MACHINE

This application is the National Phase of International Application PCT/IB2013/060976 filed Dec. 16, 2013 which designated the U.S.

This application claims priority to Italian Patent Application No. BO2012A000682 filed Dec. 18, 2012 and Italian Patent Application No. BO2013A000424 dated Jul. 31, 2013. The entirety of both applications are incorporated by reference herein.

TECHNICAL FIELD

This invention relates to a rotary electric machine and in particular to a brushless motor with sealed electronics and an open casing for heat dissipation.

BACKGROUND ART

Brushless motors schematically comprise a casing closed by a cap to form a housing in which there is a wound stator and a rotor with permanent magnets.

Brushless motors are also equipped with control electronics which control their operation and can be positioned inside or outside the above-mentioned housing.

One type of motor, called the open type, has apertures on the casing which allow the circulation of air for cooling the stator windings.

The market requires motors or open motors, that is to say, motors which are easy to cool, but which are equipped with sealed electronics, so as to obtain a product which is more reliable since the electronic components are protected from outside agents.

Usually, the motors of the type described are designed for driving fans in electric ventilators for cooling radiant masses.

In these applications in particular, the electric ventilators are supported by a fan duct using the motor casing; more specifically, in numerous prior art solutions, the fan duct of the electric ventilator comprises a ring for mounting the motor the casing of which is equipped with protrusions for coupling with the ring.

In an example prior art solution the electronic circuits are located inside a housing which is sealed closed and which is, in turn, positioned inside the motor. More precisely, in the prior art solutions, the housing which encloses the electronics is located in the motor cap inside the motor and the board inside it is connected to the stator by connectors, for example faston connectors.

These latter solutions are not free of disadvantages.

The closing cap must be oversized in order to be able to receive inside it a closed housing incorporating the control electronics.

The electronics are very close to the stator windings and in the same environment and therefore may be affected by the temperature increase caused by motor operation.

Moreover, the connection of the stator windings to the printed circuit board is made by means of connectors and is easily subject to reliability and efficiency problems due to, for example, vibrations or wear on the contact itself.

The fan duct must have the mounting ring and the coupling with the respective electric ventilator is relatively complex.

In particular applications, the coupling of the motor with the corresponding fan duct or with a diffuser for diffusing the flow generated by the fan is unsatisfactory from a fluid dynamic point of view.

DISCLOSURE OF THE INVENTION

In this context, the main technical purpose of this invention is to provide a rotary electric machine that is free of the above-mentioned disadvantages.

One aim of this invention is to provide a brushless motor in which during operation the control electronics are not affected by the heat from the motor.

Another aim is to provide an electric motor whose electronics are protected from outside agents.

Another aim is to provide an electric motor in which the connections between the electronics and the stator are more reliable than in prior art solutions.

Another aim of the invention is to provide an electric machine which can be easily and precisely installed in a corresponding diffuser or fan duct.

The technical purpose indicated and the aims specified are substantially achieved by an electrical machine according to the present disclosure.

BRIEF DESCRIPTION OF DRAWINGS

Further features and advantages of this invention are more apparent in the detailed description below, with reference to a non-limiting and non-exclusive preferred embodiment of an electrical machine, as illustrated in the accompanying drawings, in which.

DETAILED DESCRIPTION OF PREFERRED EMBODIMENTS OF THE INVENTION

Figure 3:
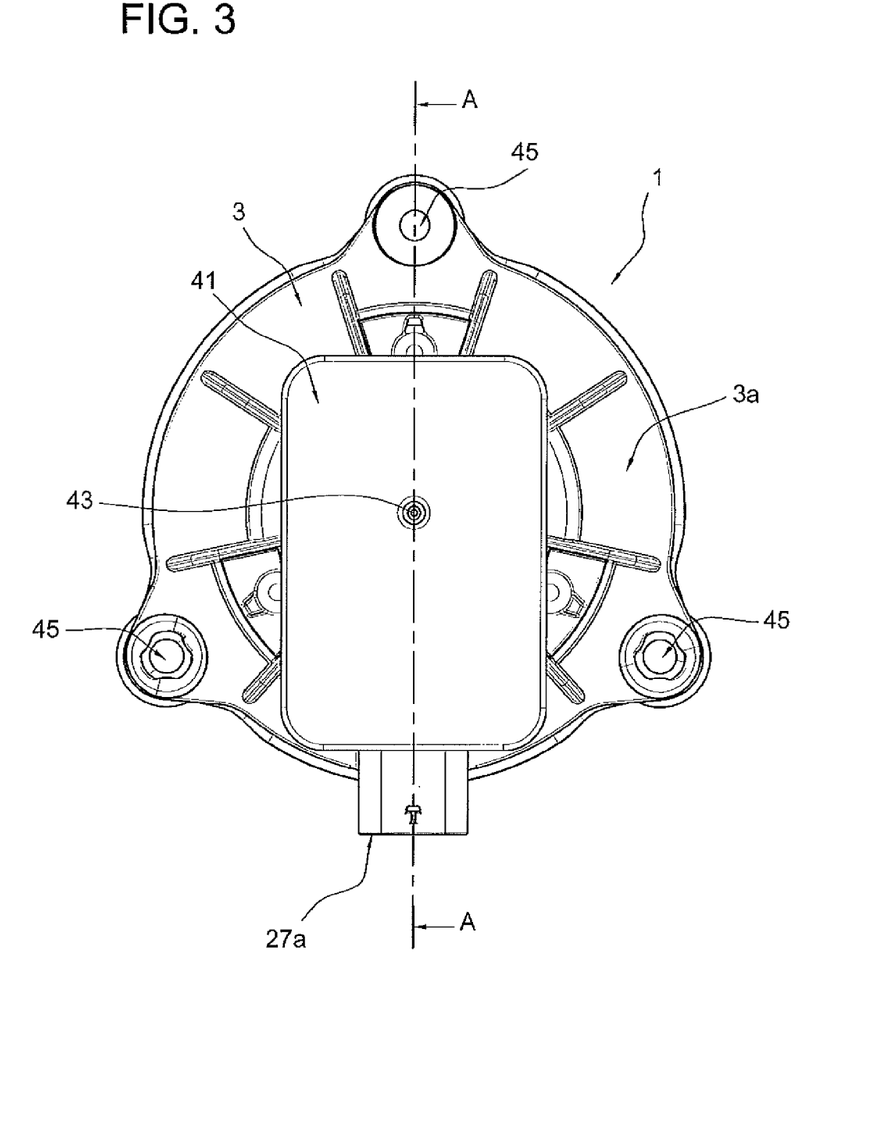
FIG. 3 is a schematic plan view of the electric machine of the previous figures.

With reference to the accompanying drawings, in particular with reference to FIGS. 1, 3 and 4, the numeral 1 denotes an electric machine according to this invention, more specifically a brushless electric motor to which specific reference is made below.

As is explained in more detail below, said motor 1 is of the open type with sealed control electronics and is preferably intended for driving a fan 50 in a ventilation unit 51.

The unit comprises the motor 1, the fan 50 driven by the motor 1 and a diffuser 46 which supports the motor 1 and conveys the flow generated by the fan 50.

In an embodiment, the ventilation unit 51 is of the type such as that described in application ITBO2012A000298.

The motor 1, having an axis R of rotation, comprises a casing 2, provided with ventilation and cooling holes 2*a*, a cap 3 coupled to the casing 2 to form a housing 4 of the electric motor 1.

The cap 3 comprises a flange 3a which extends radially beyond the casing 2.

The flange 3a is used for mounting the motor 1 in the above-mentioned ventilation unit by means of a set of holes 45.

A wound stator 5 is fixed inside the casing 2.

The stator 5 comprises a ferromagnetic core 6, formed by a pack of laminations 6a, a pair of front pieces 7 which cover the core 6 and a winding 8.

The winding 8 is formed by a plurality of coils 9, each wound on a corresponding stator tooth 10.

Figure 1:
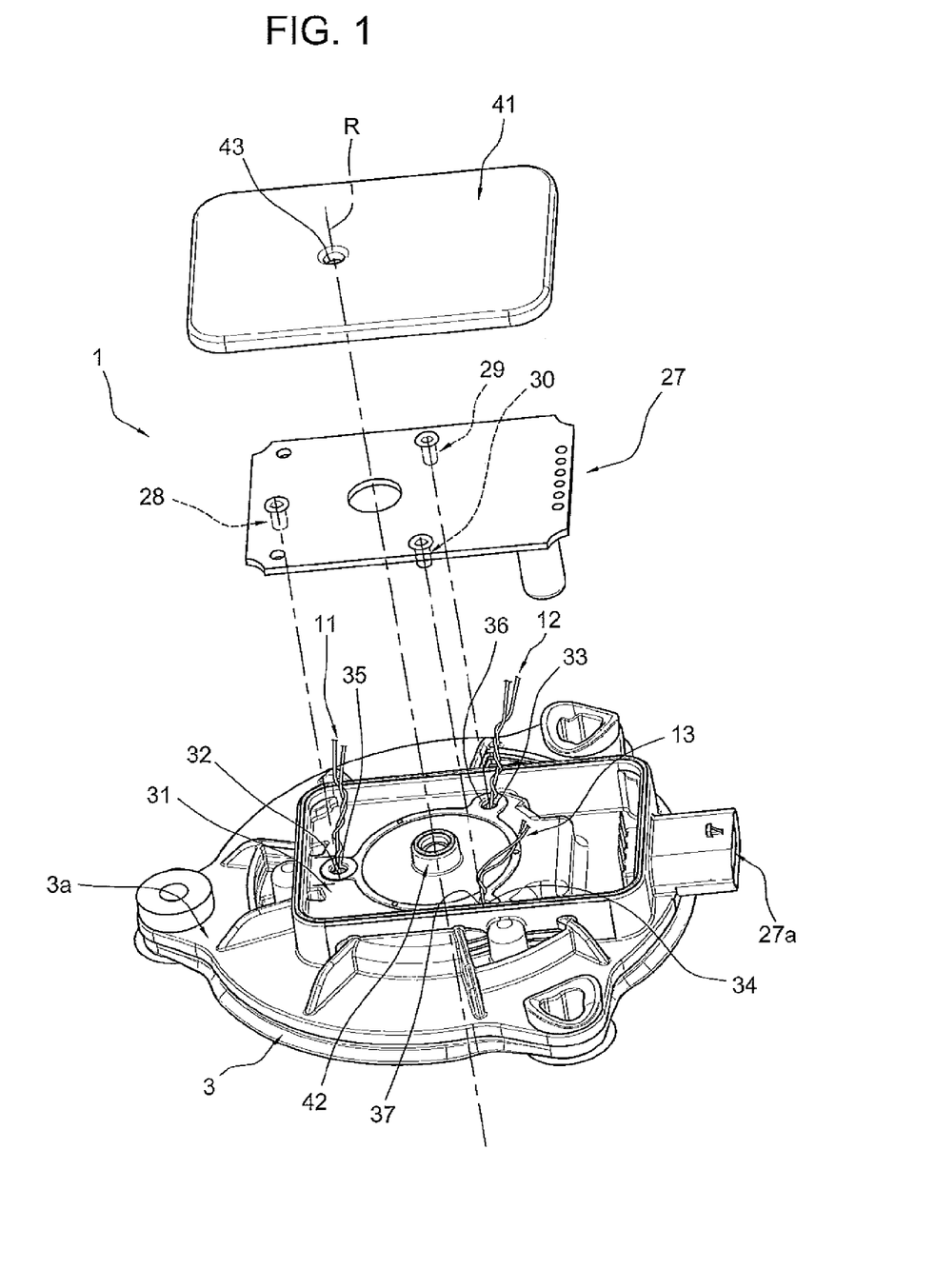
FIG. 1 is a schematic exploded perspective view, with some parts cut away for greater clarity, of an electric machine according to this invention.
Figure 5:
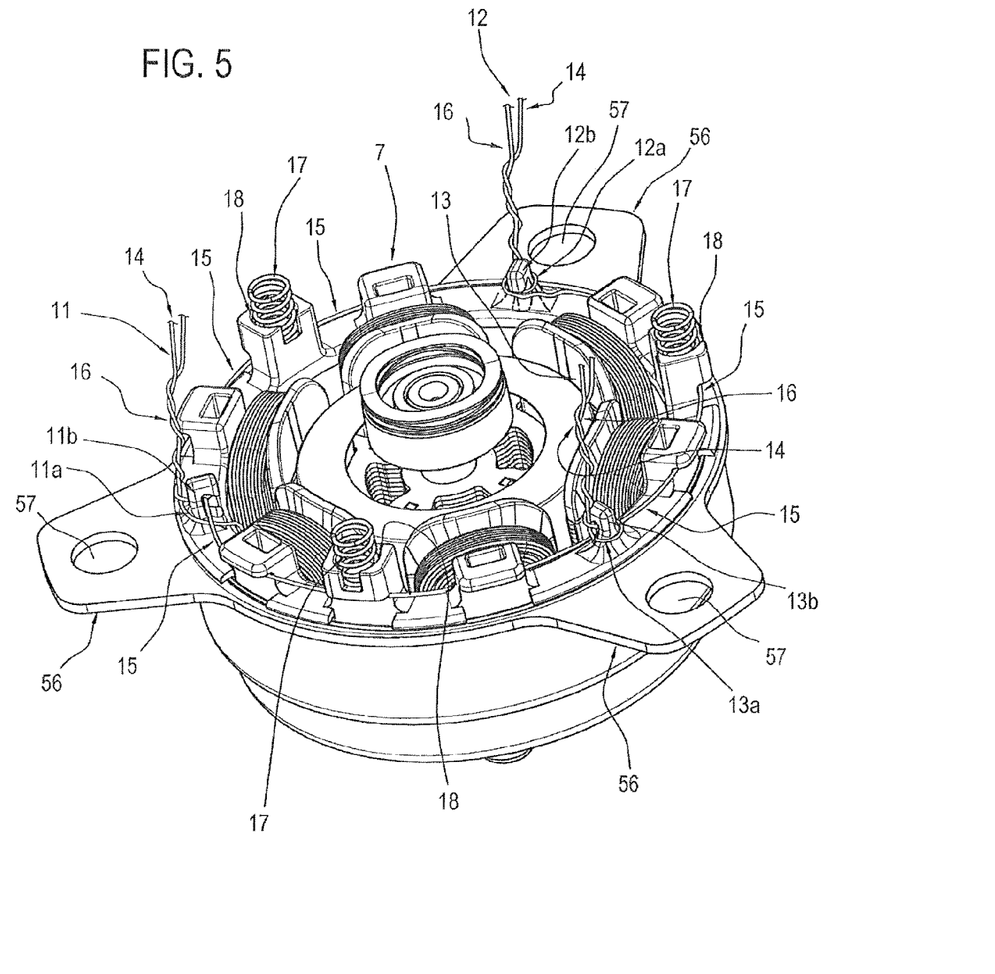
FIG. 5 is a schematic perspective view of a portion of the electric machine according to this invention.

In the example illustrated, in particular with reference to FIGS. 1 and 5, the motor 1 is three-phase and the winding 8 has three free ends 11, 12, 13 each corresponding to one phase of the motor 1.

Each phase end 11, 12, 13 is a pair of twisted wires which form a twisted portion of the corresponding phase.

Preferably, as explained in more detail below, the winding 8 is made using wire which can be soldered, that is to say, using wire whose insulating covering is removed at a predetermined temperature, for example at a temperature greater than 400 ° C.

In the preferred embodiment illustrated, the ends 11, 12 and 13 of the phase each comprise a flexible portion 14.

More precisely, for each phase the winding 8 comprises a corresponding flexible portion 14.

In the preferred embodiment illustrated, each flexible portion 14 comprises at least one first arm 15, two in the example illustrated, transversal to the axis R of rotation and a second arm 16 parallel with the axis R of rotation.

The second arm 16 forms the corresponding end 11, 12 and 13 of the winding 8 and is formed, for each phase, as already indicated, by a pair of twisted wires.

It should be noticed in particular with reference to FIGS. 1 and 5 that for clarity the ends 11, 12 and 13 are illustrated in a particularly elongate form. To keep the stator 5 in an optimum position inside the casing 2, the motor 1 comprises a plurality of springs 17 acting between the stator 5 and the housing 4.

More precisely, the springs 17 are of the helical type and have a line of action which is parallel with the axis R.

In the example illustrated, in particular with reference to FIG. 5, the front piece 7 facing towards the cap 3 has three seats 18 for as many springs 17.

Figure 2:
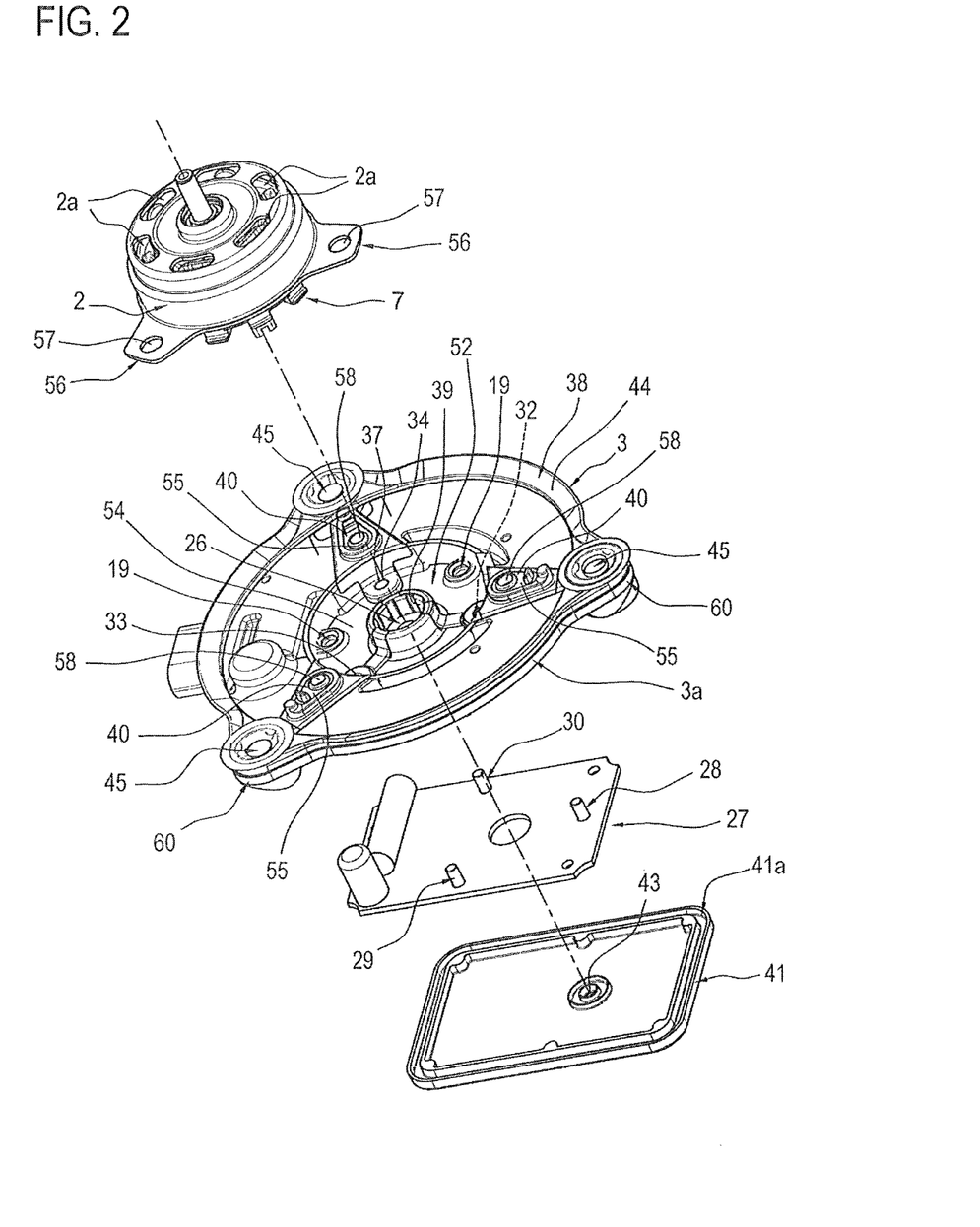
FIG. 2 is a second schematic exploded perspective view, with some parts cut away for greater clarity, of the electric machine of FIG. 1.

Specularly, as illustrated for example in FIG. 2, the cap 3 has another three seats 19, of which only two are visible, for the corresponding springs 17.

The springs 17 are inserted between the stator 5 and the cap 3 and positioned in the seats 18 and 19.

The motor 1 comprises a rotor 20 inserted in the housing 4 and rotatably constrained to it.

The rotor 20, of the substantially known type, comprises a laminations pack 21 on whose outer surface magnets 22 are fixed.

The rotor 20 comprises a shaft 23 which is fixed by means of two bearings 24, 25 to the housing 4. According to what is illustrated, the cap 3 comprises a seat 26 for the bearing 24.

With particular reference to FIGS. 1 and 2, it should be noticed that the motor 1 comprises a printed circuit board 27 for controlling the motor 1.

The board 27 is connected to the stator 5, in particular to the above-mentioned first, second and third ends 11, 12 and 13, for powering the phases of the winding 8.

The board 27 comprises a set of three tubes 28, 29 and 30, preferably made of metal, each intended to be connected to one end 11, 12, 13, that is to say, to a corresponding stator phase, of the winding 8 as described below.

The outside of the housing 4 comprises a seat 31 for the printed circuit board 27 and the printed circuit board 27 is held in said seat 31.

The seat 31 is in communication with the inside of the housing 4 by means of a set of three through holes 32, 33, 34 intended for the passage of the ends 11, 12, 13 of the stator 5 phases.

In the preferred embodiment illustrated, the seat 31 is made in the cap 3 on the outside of the housing 4 and the holes 32, 33, 34 are made in the cap 3 itself.

With reference to FIG. 5, it should be noticed that each end 11, 12, 13 comprises, at the base of the respective twisted portion, that is to say of the respective arm 16, a loop 11a, 12a, 13a.

The front piece 7 comprises a set of three hooks 11b, 12b, 13b positioned on the front piece 7 at the holes 32, 33, 34.

In use, each hook 11b, 12b, 13b is aligned according to the direction defined by the axis R of rotation with a corresponding hole 32, 33, 34.

The loops 11a, 12a, 13a engage with a corresponding hook 11b, 12b, 13b in such a way that the ends 11, 12 and 13 of the phases are kept substantially at the holes 32, 33, 34 in a predetermined position.

In that way, in particular during motor 1 assembly, the ends 11, 12 and 13 of the phases are easy to insert in the corresponding holes 32, 33, 34.

The board 27 comprises a power terminal block 27a, which can be connected to wiring which is not illustrated.

Preferably, the sealing of the seat 31 at the terminal block 27 is achieved, in a substantially known way which is not described any further, by placing something on the wiring, for example a closing cover.

In use, each end 11, 12, 13 of the winding 8 is inserted, as shown, in the corresponding hole 32, 33, 34.

Each end 11, 12, 13 is inserted in the seat 31 through the corresponding hole 32, 33, 34.

The machine 1 comprises a rigid system 100 for sealed connection between the board 27 and the stator winding 8.

The system 100 is located, for each phase, substantially at the transit hole 32, 33, 34 for the respective end 11, 12, 13 of the winding 8.

The system 100 comprise the ends 11, 12, 13 of the winding 8 which are inserted in the corresponding hole 32, 33, 34.

The system 100 comprises a seal 35, 36, 37 for each hole 32, 33, 34.

Each seal 35, 36, 37 internally covers the respective hole 32, 33, 34 and is preferably made of rubber, for example having a hardness of 40 Shore.

In the preferred embodiment illustrated for example each seal 35, 36, 37 is tubular, coaxial with the respective hole 32, 33, 34 and inserted in the latter.

The ends 11, 12, 13 of the winding 8 are inserted through the corresponding seal 35, 36, 37.

The system 100 comprises a set of conducting elements, for example metal, made of copper or brass, which are positioned in a corresponding hole 32, 33, 34 between the end 11, 12, 13 of the winding 8 and the corresponding seal 35, 36, 37.

The phases are connected to the board 27 by means of the corresponding metal element.

Preferably, each conducting element is formed by the above-mentioned tubes 28, 29, 30 which are inserted in a corresponding hole 32, 33, 34 and in the seal 35, 36, 37.

The ends 11, 12, 13 of the phases are each inserted in the respective tube 28, 29, 30 and soldered to it. The soldering for joining the ends 11, 12, 13 to the respective tube 28, 29, 30 is performed in such a way that the tube 28, 29, 30 is closed inside.

Figure 4:
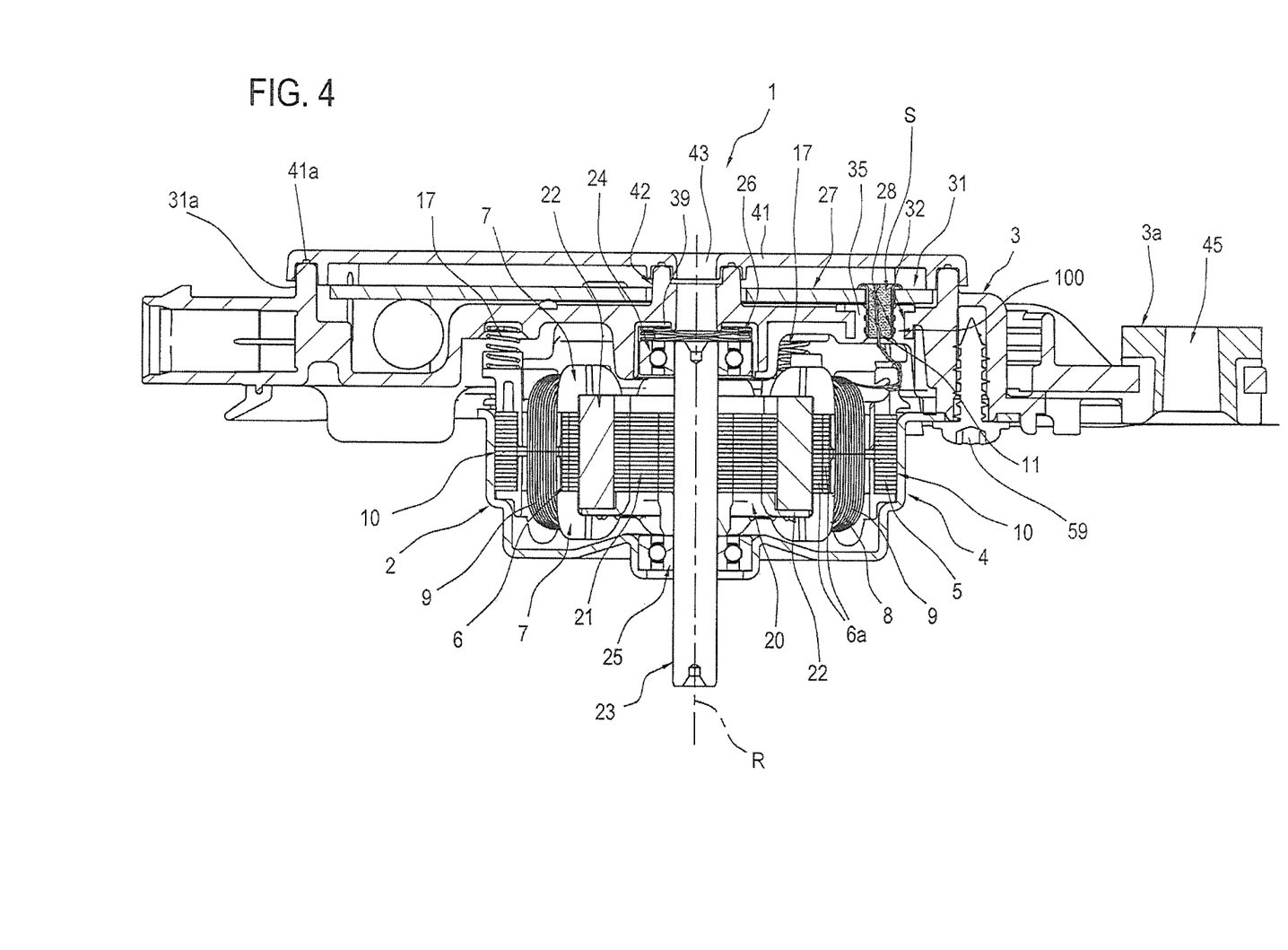
FIG. 4 is a schematic cross-section according to the plane A-A of FIG. 3, with some parts cut away for greater clarity, of the electric machine of the previous figures.

FIG. 4 schematically illustrates for example the end 11 soldered to the corresponding tube 28.

The reference character S is used to label the solder which fills the tube 28.

In use, the tubes 28, 29, 30 have the rubber of the respective seal 35, 36, 37 on the outside of them, whilst the phase ends 11, 12, 13 pass inside them.

Advantageously, the seal 35, 36, 37 interposed between the cap 3 and the tubes 28, 29, 30 at the holes 32, 33, 34 causes sealing between the outside of the tubes and the cap.

Moreover, the printed circuit board 27 remains correctly positioned in the seat 31 in particular during machine 1 assembly.

The flexible portion 14, or at least the part of the flexible portion which is not soldered inside the respective tube, allows relative mobility between the stator 5 and the printed circuit board, to which the coils 9 are rigidly connected, which guarantees motor 1 optimum assembly and operation.

In particular, the loops 11a, 12a, 13b are free to run along the corresponding hook 11b, 12b, 13b which preferably extends mainly according to the axis R.

As already indicated, the wire of the winding 8 is of the type which can be soldered and, advantageously, the inside of the tubes 28, 29, 30 is filled with the solder material, for example tin.

In that way, the transit holes 32, 33, 34 for the windings in the cap are sealed closed by the seal, by the tube and by the solder inside it.

Any water or the like present in the housing 4 cannot reach the printed circuit board 27, since all passages through which the phases are connected to the board 27 are sealed closed.

With reference for example to FIG. 2, it should be noticed that the motor 1 comprises a seal 38 at the cap 3.

In particular, the seal 38 is intended for absorbing vibrations and is at least partly positioned between the casing 2 and the cap 3. Preferably, the seal 38 is made of rubber and has, for example, a hardness of 40 Shore.

The seal 38 comprises a first portion 39 at the seat 26 of the bearing 24 to prevent the vibrations generated by the rotor 20 from propagating on the housing 4 and therefore also to the cooling system for which the motor 1 is preferably intended.

The seal 38 comprises a second portion 40 positioned between the casing 2 and the cap 3 in the coupling zones.

The seal 38 comprises an annular third portion 44, external relative to the portions 39 and 40.

The portion 44 forms an airtight seal between the cap 3 and the ventilation unit for which the motor 1 is preferably intended.

In particular, the portion 44 forms an airtight seal between the cap 3 and the diffuser 46.

In the preferred embodiment illustrated, the seal 38 is made in one piece with the seals 35, 36, 37.

Preferably, the seal 38 and the seals 35, 36, 37 are moulded together with the cap 3.

In alternative embodiments not illustrated, the separate seals are independent of one another.

The motor 1 comprises a seat 31 closing lid 41 which is coupled in a sealed fashion to the cap 3.

More precisely, an outer edge 41a of the lid 41 is laser soldered to the cap 3 at an outer wall 31a of the seat 31.

As shown in FIG. 4, the cap 3 comprises a tube 42, coaxial with the axis R, which projects on the opposite side to the stator 5.

The lid 41 comprises a hole 43, also coaxial with the axis R, whose edge is soldered to the tube 42.

In that way, an access to the shaft 23 is formed, for the passage of a contact element, not illustrated, necessary when a fan, not illustrated, is mounted on the shaft on the opposite side.

Figure 6:
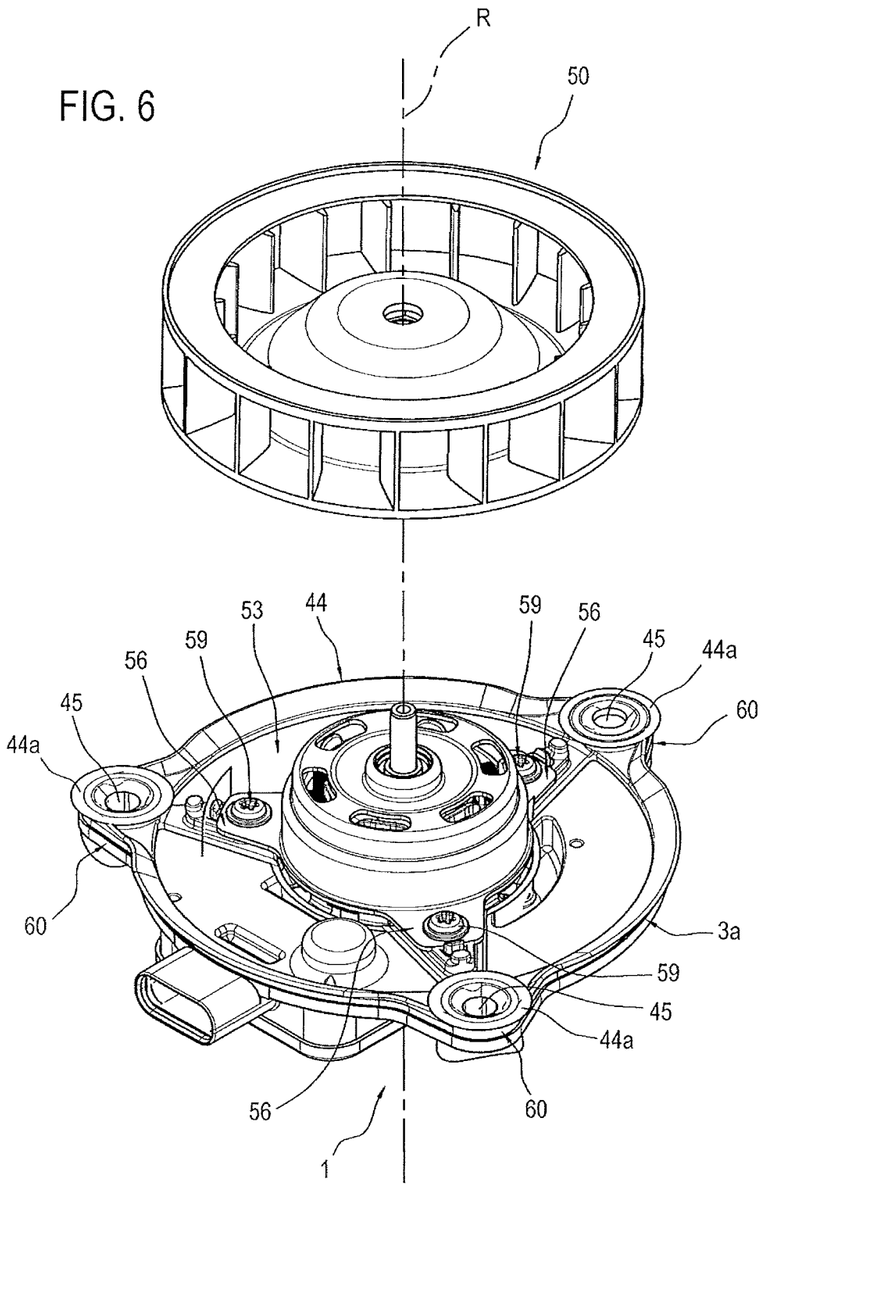
FIG. 6 is a schematic, partly exploded, perspective view of an electric ventilator comprising an electric machine according to this invention.
Figure 7:
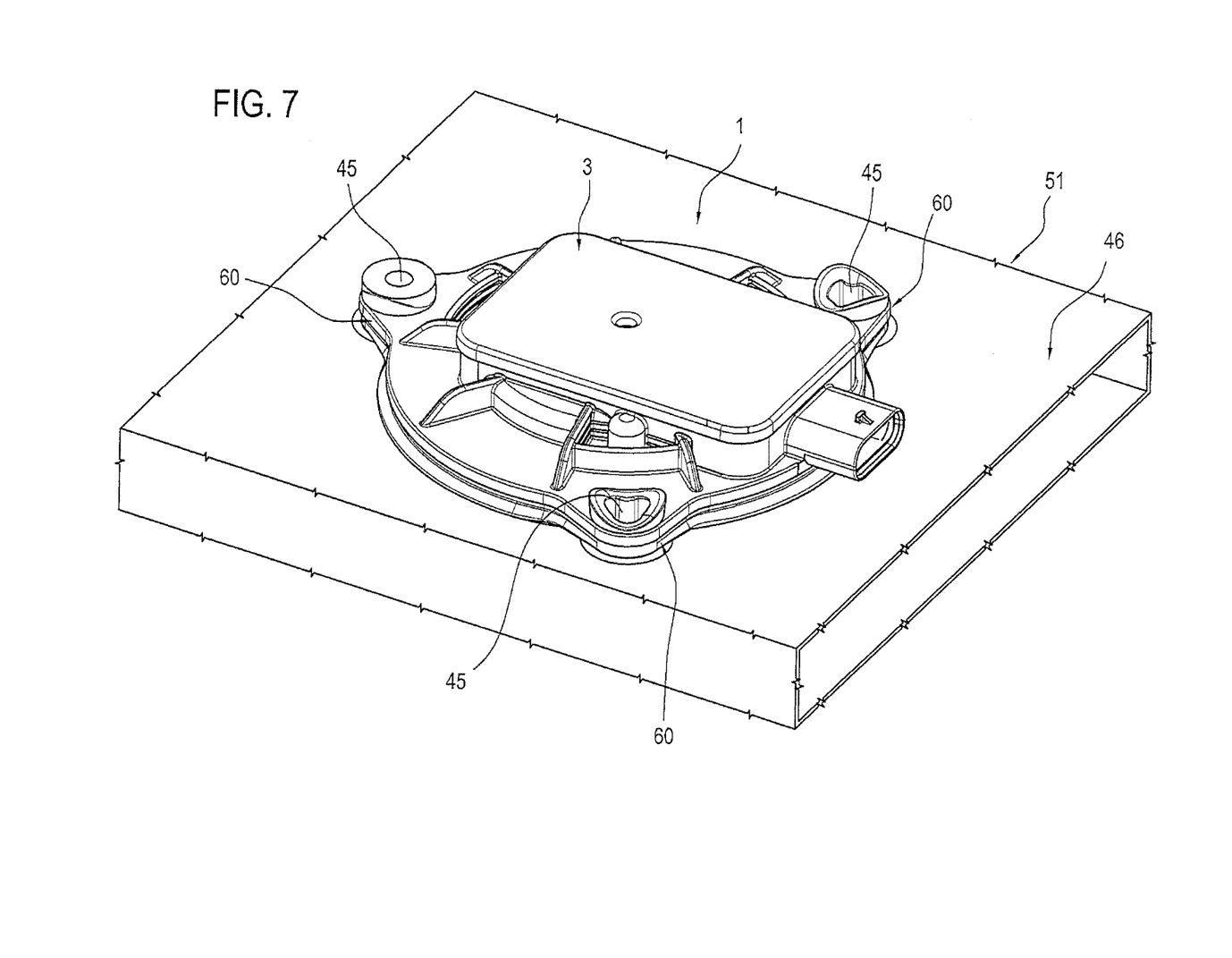
FIG. 7 is a schematic perspective view of a preferred assembly configuration of the electric ventilator of FIG. 6.

With particular reference to FIGS. 2, 6 and 7, looking in more detail at the cap 3, it should be noted that it comprises a first central portion 52 in which the seat 26 of the bearing 24 is made, and a second peripheral portion 53 extending from the central portion 52.

The portion 53 extends from the central portion 52 away from the axis of rotation R beyond the casing 2 and comprises the above-mentioned flange 3a for mounting the electric machine 1 in the diffuser 46.

The central portion 52 is the part of the cap 3 intended to close the casing 2.

The portion 52 comprises a disc-shaped portion 54, coaxial with the rotor 20 and in which the seat 26 is made, and a plurality of zones 55, three in the example illustrated, in which the casing 2 is fixed.

The holes 32, 33 and 34 for passage of the ends of the windings are provided in the central portion 52, in particular in the disc-shaped portion 54.

The casing 2 comprises a plurality of protrusions 56, three in the example illustrated, each equipped with a corresponding hole 57, intended for the coupling with the cap 3, each at a zone 55.

The above-mentioned portion 40 of the seal 38 is in particular interposed between the protrusions 56 and the zones 55.

At each zone 55, the cap 3 has a blind hole 58 and the machine 1 comprises screws 59 which through the holes 57 engage in a corresponding blind hole 58.

The peripheral portion 53 of the cap 3 extends from the portion 54 between the zones 55.

The above-mentioned flange 3a is outside the zones 55 with respect to the axis of rotation R and comprises a plurality of protrusions 60, three in the example illustrated, in each of which one of the above-mentioned holes 45 is made.

The peripheral portion 53 without the flange 3a and the protrusions 60 has plan dimensions substantially equal to the plan dimensions of the fan 50.

The outer annular portion 44 of the seal 38 extends substantially along the flange 3a and comprises a plurality of annular portions 44a at the above-mentioned holes 45.

The portion 44 faces towards the casing 2 and forms an airtight seal between the motor 1, in particular between the cap 3, and the diffuser 46.

The diffuser 46 has a hole, not illustrated, for inserting the fan 50 and a surface surrounding the hole for resting and fixing the motor 1 using the protrusions 60.

In an embodiment, the cap 3 is screwed to the diffuser 46 using screws not illustrated.

As illustrated in particular in FIG. 2, each above-mentioned hole 45 is aligned according to a radius passing through the axis of rotation R with a corresponding hole 58 and with a hole 32, 33, 34 to facilitate the moulding of the seal 38 and the seals 35, 36 and 37 in a single body.

In an embodiment an electric machine 1 having an axis of rotation R comprises a casing 2; a cap 3 coupled to the casing 2 to define a housing 4 of the electric machine; a stator 5 housed in the housing 4; a control printed circuit board 27 in communication with the stator 5; a rotor 20 inserted in the housing 4 and rotatably constrained to it, sealing means at least partly inserted between the casing 2 and the cap 3.

The cap 3 comprises a first central portion 52, having a seat 26 for a bearing 24 supporting the rotor, coupled with the casing 2 for closing the casing 2 and forming the housing 4.

The cap comprises a second peripheral portion 53 extending from the first central portion 52 away from the axis of rotation R beyond the casing 2 and comprising means for fixing the electric machine 1 for mounting the electric machine 1 in a corresponding diffuser 46.

Preferably, the sealing means comprise a first seal portion 39 at the seat 26.

Preferably, the sealing means comprise a second seal portion 40 positioned between the casing 2 and the cap 3.

Preferably, the second seal portion 40 is interposed between the first central portion 52 of the casing 2 and the cap 3.

Preferably, the sealing means comprise a substantially annular third seal portion 44, 44a associated with the second portion 53 of the cap and facing towards the casing 2.

Preferably, the first seal portion 39, the second seal portion 40 and the third seal portion 44 define a single seal.

Preferably, the outside of the housing 4 comprises a seat 31 for the printed circuit board 27, in communication with the inside of the housing 4 by means of, for example, a first, a second and a third hole 32, 33, 34.

The printed circuit board 27 is housed in the seat 31 and the sealing means comprise a first, a second and a third tubular seal 35, 36, 37, each coaxial with a respective hole 32, 33, 34 and inserted in it.

Preferably, the holes 32, 33, 34 are provided in the first central portion 52 of the cap 3.

Preferably, the first seal portion 39, the second seal portion 40 and the third seal portion 44 defining a single seal and the tubular seals 35, 36, 37 are made as a single body.

Advantageously, the sealing means are made as a single body with the cap 3.

The invention described brings important advantages.

The electronics are kept separate from the motor, outside the housing and are not affected by the motor operating temperatures.

The electronics are rigidly connected to the stator in a more reliable way than using connectors.

At the same time, the loops able to move along the respective hooks and the end twist of the phases, serve a springing function which dampens the vibrations generated in use, preserving the soldering which, as indicated, is relatively rigid.

In any event, the electronics are protected from outside agents although the motor has the casing open for cooling the windings.

In fact, soldering the phases to the printed circuit board, completely blocking the tubes of the board, causes sealing of the board seat.

The positioning of the electronics close to the stator helps to reduce irradiated magnetic fields, improving the motor electromagnetic compatibility compared with solutions in which the electronics are separate and distant.

The shape of the cap allows both the closing of the casing and the assembly of the motor using the cap itself without using parts of the casing.

Basically, the cap has a part for assembling and a part, different from the previous one, for closing the motor.

The assembly flange equipped with the seal determines the seal between motor and diffuser with a significant increase in the performance of the ventilation unit in which the machine 1 is mounted.

The invention claimed is:

1. An electrical machine having an axis of rotation and comprising:
   a casing;
   a cap coupled to the casing to form a housing of the electric machine;
   a stator, comprising a plurality of poles and a winding comprising an end, fitted in an interior of the housing;
   a rotor rotatably positioned in the interior of the housing;
   a control printed circuit board connected to the stator;
   a seat positioned on an exterior of the housing for the printed circuit board, the printed circuit board being housed in the seat,
   the housing including a hole passing from the interior of the housing to the exterior of the housing adjacent the circuit board,
   an electrical connection electrically connecting the winding to the printed circuit board through the hole,
   a rigid system sealed connection including a first seal sealing the electrical connection with respect to the hole to seal the interior of the housing from the printed circuit board.

2. The machine according to claim 1, wherein the rigid system sealed connection comprises the end of the winding inserted in the hole.

3. The machine according to claim 2, wherein thethe first seal is positioned in the hole between the end of the winding and the housing.

4. The machine according to claim 3, wherein the first seal is tubular, coaxial with the hole and inserted in the hole, the end of the winding being inserted in the tubular seal.

5. The machine according to claim 3, wherein the rigid system sealed connection comprises a conducting element positioned in the hole between the end of the winding and the seal, the conducting element being connected to the printed circuit board, the end of the winding being connected to the conducting element.

6. The machine according to claim 5, wherein the conducting element is formed by a tube which is coaxial with the hole and inserted in the hole, the end of the winding being inserted in the tube.

7. The machine according to claim 5, wherein the end of the winding is soldered to the conducting element to seal the conducting element.

8. The machine according to claim 1, and further comprising at least one spring acting between the stator and the housing for holding the stator stationary in the housing.

9. The machine according to claim 1, and further comprising a second seal at least partly inserted between the casing and the cap, the cap comprising a first central portion having a seat for a bearing supporting the rotor, the first central portion being coupled with the casing to close the casing and define the housing, the cap comprising a second peripheral portion extending from the first central portion away from the axis of rotation beyond the casing and comprising means for fixing the electric machine for assembly of the electric machine in a corresponding diffuser.

10. The machine according to claim 9, wherein the second seal comprises a first seal portion at the seat.

11. The machine according to claim 10, wherein the second seal comprises a second seal portion positioned between the casing and the cap.

12. The machine according to claim 11, wherein the second seal portion is interposed between the first central portion of the casing and the cap.

13. The machine according to claim 12, wherein the second seal comprises a substantially annular third seal portion associated with the second portion of the cap and facing towards the casing.

14. The machine according to claim 13, wherein the first seal portion, the second seal portion and the third seal portion define a single seal.

15. The machine according to claim 9, wherein the hole is provided in the first central portion of the cap.

16. The machine according to claim 9, wherein the second seal is made in a single body with the cap.

17. The machine according to claim 13, wherein the first seal portion, the second seal portion, the third seal portion and the first seal are made in a single body, wherein the first seal is tubular, coaxial with the hole and inserted in the hole, the end of the winding being inserted in the tubular seal.

18. The machine according to claim 1, wherein the rigid system sealed connection comprises a conducting element positioned in the hole between the end of the winding and the seal, the conducting element being connected to the printed circuit board, the end of the winding being connected to the conducting element;
wherein the conducting element is formed by a tube which is coaxial with the hole and inserted in the hole, the end of the winding being inserted in the tube.

19. The machine according to claim 18, wherein the end of the winding is soldered to the conducting element to seal the conducting element.

20. An electrical machine having an axis of rotation and comprising:
a casing;
a cap coupled to the casing to form a housing of the electric machine;
a stator, comprising a plurality of poles and a winding comprising an end, fitted in an interior of the housing;
a rotor rotatably positioned in the interior of the housing;
a control printed circuit board connected to the stator;
a seat positioned on an exterior of the housing for the printed circuit board, the printed circuit board being housed in the seat,
a rigid system sealed connection including a first seal sealing the interior of the housing from the printed circuit board;
a second seal at least partly inserted between the casing and the cap, the cap comprising a first central portion having a seat for a bearing supporting the rotor, the first central portion being coupled with the casing to close the casing and define the housing, the cap comprising a second peripheral portion extending from the first central portion away from the axis of rotation beyond the casing and comprising means for fixing the electric machine for assembly of the electric machine in a corresponding diffuser.

* * * * *